United States Patent [19]

Kuo et al.

[11] Patent Number: 5,008,132

[45] Date of Patent: Apr. 16, 1991

[54] PROCESS FOR PREPARING TITANIUM NITRIDE COATED SILICON CARBIDE MATERIALS

[75] Inventors: Shih-Yee Kuo; Hyun-Sam Cho; Jeffrey D. Bright, all of Salt Lake City, Utah

[73] Assignee: Norton Company, Worcester, Mass.

[21] Appl. No.: 362,188

[22] Filed: Jun. 6, 1989

[51] Int. Cl.$^5$ .................. C23C 16/08; C23C 16/14; C23C 16/56; C23C 8/24

[52] U.S. Cl. .................. 427/217; 427/215; 427/252; 427/253; 427/343; 427/377; 427/419.7

[58] Field of Search .............. 427/215, 217, 252, 253, 427/314, 343, 419.7, 377; 51/295, 297, 307, 309

[56] References Cited

U.S. PATENT DOCUMENTS

| | | | |
|---|---|---|---|
| 3,407,090 | 10/1968 | Hertl | 427/215 |
| 4,196,233 | 4/1980 | Bitzer et al. | 427/252 |
| 4,399,167 | 8/1983 | Pipkin | 427/217 |
| 4,459,328 | 7/1984 | Mizuhara | 427/343 |
| 4,505,720 | 3/1985 | Gabor et al. | 427/217 |
| 4,810,530 | 3/1989 | D'Angelo et al. | 427/419.7 |
| 4,880,755 | 11/1989 | Mehrotra et al. | 427/215 |

FOREIGN PATENT DOCUMENTS 59-129763  7/1984  Japan ............... 427/419.7

*Primary Examiner*—Norman Morgenstern
*Assistant Examiner*—Margaret Bueker
*Attorney, Agent, or Firm*—Arthur A. Loiselle, Jr.

[57] ABSTRACT

Finely divided silicon carbide materials, particularly powders, whiskers and short fibers, are provided with a titanium nitride surface coating by the process of (i) placing a low carbon diffusivity layer atop the silicon carbide, (ii) placing a titanium metal coating atop the low carbon diffusivity layer, and (iii) nitriding the titanium metal.

12 Claims, No Drawings

PROCESS FOR PREPARING TITANIUM NITRIDE COATED SILICON CARBIDE MATERIALS

TECHNICAL FIELD

This invention relates to individual silicon carbide materials, i.e powders, whiskers, and fibers, which have a titanium nitride surface coating thereon. The coated materials are produced by (i) placing a low carbon diffusivity layer atop the silicon carbide materials, (ii) placing a titanium metal coating atop the low diffusivity layer, and (iii) nitriding the titanium metal coated materials. The materials so coated are useful in metal matrix composites to strengthen the matrix and prevent undesirable deleterious interactions between the silicon carbide core and the metal matrix.

BACKGROUND AND INFORMATION DISCLOSURE STATEMENT

The following publications are representative of the most relevant prior art known to Applicants at the time of filing of this application:

| UNITED STATES PATENTS | | |
|---|---|---|
| 3,959,557 | May 25, 1976 | A. R. Berry |
| 4,134,759 | January 16, 1979 | S. Yajima et al. |
| 4,252,062 | February 24, 1981 | N. Nishida |
| 4,505,720 | March 19, 1985 | T. Gabor et al. |
| 4,708,542 | November 24, 1987 | D. J. Emmanuelli |
| FOREIGN PATENT APPLICATION | | |
| DE 3608734 | January 2, 1987 | Feldmuhle AG |

Titanium nitride coatings have been placed on various materials to provide wear resistance or corrosion resistance or other similar properties. Generally these coatings have been produced on metal articles by chemical vapor deposition (CVD) or similar processes. For instance, U.S. Pat. No. 3,959,557 discloses the CVD deposition of TiN to produce wear-resistant, nonabrasive surfaces on plain carbon steel articles, and U.S. Pat. No. 4,252,862 discloses depositing TiN on external ornamental metal parts such as wrist watch cases, bands or bezels to obtain a gold-colored surface having corrosion and wear resistance properties. Also, U.S. Pat. No. 4,708,542 discloses that a TiN coated metal tap has superior life to an uncoated tap.

In addition, titanium nitride coatings have been placed on ceramics by CVD processes. U.S. Pat. No. 4,134,759 discloses that metal or ceramic coated continuous silicon carbon fibers which contain a substantial amount of free carbon have improved wettability with aluminum and aluminum alloys when coated with various compounds, including, among others, titanium nitride. No layer intermediate the silicon carbide continuous fibers and the titanium nitride is suggested.

U.S. Pat. No. 4,505,720 discloses the CVD deposition of titanium nitride, among others, directly upon granules of silicon carbide. In this patent, there is no low diffusivity layer between the silicon carbide core and the titanium nitride coating. The granules are quite large, thereby making CVD suitable for performing the coating process. The CVD process, when performed on very fine silicon carbide materials, has been found not to work to produce a complete titanium nitride coating. The process of the present invention permits the titanium nitride coating of such very fine materials.

German Appln DE 3608734 discloses ceramic cutting tools having, among others, titanium carbonitride coatings. The tools are prepared from sintered ceramic bodies which are coated with an intermediate bonding layer of silica which is deposited by either CVD or plasma vapor deposition (PVD). Then the silica layer is CVD or PVD-coated with a cutting layer of alumina, zirconia, hafnia, their mixture, or a titanium carbonitride. The silica interlayer is stated to improve the adhesion of the hard outer coating to the sintered ceramic core. The present invention is not directed to placing coatings on sintered ceramic bodies, but rather on individual particles, fibers or whiskers of silicon carbide, and avoids using CVD to deposit the titanium nitride coating.

Nitriding of titanium to convert the metal to titanium nitride is a well-known procedure. Normally, it readily occurs by heating the titanium metal to an elevated temperature in a nonoxidizing nitrogen-containing environment for a sufficient time to cause the nitridation. However, when titanium metal was coated onto a fine silicon carbide powder and then placed into a nitrogen environment at temperatures up to 1500° C. for up to four hours, the surface did not turn brown or gold as would have happened if titanium nitride had formed. X-ray diffraction confirmed that little or no titanium nitride formation occurred.

Since titanium nitride has substantially increased wettability and/or less solubility for certain metals and metal alloys, particularly aluminum and its alloys, than do both the uncoated silicon carbide materials and silicon carbide coated with many other materials, it is an object of the present invention to produce a titanium nitride coating on fine silicon carbide materials, particularly those materials which are not readily uniformly coated by a chemical vapor deposition process, to enhance their compatibility with such metals and metal alloys.

SUMMARY OF THE INVENTION

Titanium nitride coated silicon carbide materials are prepared in accordance with the present invention by (i) placing a layer of material having a low diffusivity for carbon atop the silicon carbide materials, (ii) placing a titanium metal coating atop the low diffusivity layer, and (iii) nitriding the titanium coated materials. The materials resulting from the process contain a silicon carbide core coated with a low carbon diffusivity layer and having thereon a surface layer of titanium nitride.

DESCRIPTION OF THE PREFERRED EMBODIMENTS

It has been found that a satisfactory titanium nitride coating can be placed on silicon carbide materials, particularly those having extremely small particle sizes/diameters by the direct nitriding of a titanium metal coating thereon only after a material having a low diffusivity to carbon has been placed between the silicon carbide and the titanium metal which is then nitrided.

The silicon carbide materials suitable for use herein may be prepared by any known suitable process and may have any desired size or shape. Preferably for use in metal matrix composites, they will be in the form of finely divided powders, whiskers, or short fibers. Generally suitable powders will have average particle sizes larger than about 0.1 micron up to about 1000 microns, preferably about 0.5 to about 500 microns, and most preferably about 1 to about 30 microns. A relatively wide distribution of particle sizes in the powder being coated has not been found detrimental to the practice of the present invention. The short fibers and whiskers which may be coated have diameters of up to about 20, preferably up to about 10, and most preferably up to about 5 microns, and lengths of up to about 2000 microns, preferably up to about 500, and most preferably up to about 200 microns.

The fine silicon carbide materials which are coated with titanium nitride by the present process have broad industrial applications. To produce the coated finely divided products, the silicon carbide materials must be provided with a coating of an intermediate layer having a low diffusivity to carbon. By the term "low diffusivity to carbon" is meant that the coating material is sufficiently resistant to penetration by carbon from the silicon carbide core, at least at the conditions of the subsequent titanium metal deposition and nitridation, to essentially preclude any interaction between the titanium metal coating and the carbon of the silicon carbide. Of course, such a material must contain no or very limited amounts of carbon. Materials having such a low carbon diffusivity and useful as the intermediate layer herein include but are not limited to such as silica, alumina, boron nitride, aluminum titanate, glasses, boron, and metal oxides, borides, and nitrides.

The manner of providing the low carbon diffusivity layer atop the fine silicon carbide materials will depend upon the particular coating which is selected. For instance, if a silica coating is to be used, the silicon carbide may be merely oxidized at elevated temperature, i.e. over about 700° C., for a period of time up to several hours, as is known from the literature. For a boron nitride coating, which has been found primarily useful on relatively coarse powders having average particle sizes of at least about 35 microns, it may be provided by chemical vapor deposition. For an alumina coating, it may be produced by conventional solgel techniques. The solgel techniques may also generally be used for many of the other oxide coatings. Alternative techniques which may be used to deposit particular coating materials on the silicon carbide cores include, such as, wet milling of the silicon carbide in an aqueous aluminum nitrate followed by pyrolysis, and pyrolysis of alkoxide precursors to form metal oxides. Any technique that produces a complete low carbon diffusivity layer on the silicon carbide materials may be used.

The absolute thickness of the intermediate coating has not been found to be critical provided that it is thick enough to prevent titanium carbide formation at the temperature and time used for the titanium coating and nitriding processes. Intermediate coating thicknesses will generally be about 200 Angstroms to about 1 micron, with the thickness of the coating being determined by the carbon diffusivity property of the coating materials, i.e. the higher the carbon diffusivity of the coating, the thicker the low carbon diffusivity layer.

Once the low diffusivity surface is placed on the fine silicon carbide materials, they are provided with a titanium metal coating which is then nitridable. The titanium metal coating may be performed by any conventional means, but a pack diffusion process is currently preferred. In a pack diffusion process, a mass of powdered titanium metal is placed in contact with the low-diffusivity-layer-coated silicon carbide materials and then heated at a temperature below about half of the melting point of the titanium for a sufficient time to deposit a titanium layer on the materials. Generally temperatures of about 600° to about 775° C. for about 30 minutes to about 5 hours will be suitable to produce the desired titanium metal coatings which generally have thicknesses of up to about a few microns. Further details on the pack diffusion process may be found in such as U.S. Pat. No. 4,399,167, the disclosure of which is incorporated herein by reference.

The titanium metal coated fine silicon carbide materials are then nitrided by heating at an elevated temperature for an extended period of time in the presence of a suitable nitrogen-containing gas. Generally, temperatures of at least about 650° C. will be used for periods ranging from about 5 minutes up to about 3 hours with either nitrogen or ammonia gas. Preferably, the temperature will be about 900° to about 1,050° C. and the period will be about 30 to about 90 minutes.

The practice of the present invention can be further appreciated from the following non-limiting examples in which all parts and percents are by weight unless otherwise specified.

EXAMPLE I

Silicon carbide fine particles having an average particle size of about 9 microns and a distribution ranging from about 1 to 30 microns are calcined in air at a temperature between 1050° C. to 1,100° C. for 2 hours to oxidize the surfaces thereof to silica. The silica-coated silicon carbide powder particles are uniformly mixed with titanium metal powder of size 60/270 U.S. mesh in a 1:5 weight ratio. The mixture is placed in a vacuum furnace at 725° C. for 2-3 hours to cause a titanium metal coating to deposit atop the silica-coated silicon carbide particles. The titanium metal coated particles are then heated in a nitrogen atmosphere at a temperature between 925° and 1,025° C. for one hour. The particles turn a brownish gold color indicating that titanium nitride has been formed and this is confirmed by x-ray diffraction analysis.

COMPARATIVE EXAMPLE A

The procedure of Example I was repeated except that the silicon carbide particles were not calcined in air to produce the heavy silica coating. The particles were subjected to pack diffusion under the same conditions as stated and then placed in the nitrogen atmosphere. After being held in the nitrogen atmosphere for one hour at 1000° C. visual examination of the particles found no brownish gold color characteristic of titanium nitride. The temperature was then raised to 1500° C. and the particles held there in nitrogen for three hours. The particles became appreciably darker grey in color, strongly suggesting that no titanium nitride was formed. X-ray diffraction analysis confirmed the absence of titanium nitride and indicated that the surfaces were predominantly titanium carbide.

EXAMPLE II

To evaluate the effect of the titanium nitride coating of Example I vs. the material produced in Comparative Example A with regard to the effect of the coatings on the pressure infiltration process, pressure infiltration and dispersion tests are performed as disclosed in U.S. Ser. No. 208,084, filed June 17, 1988, the disclosure of which is incorporated herein by reference. The coated SiC of Example I is found to readily infiltrate with both a 99.9% pure aluminum and an aluminum alloy containing about 7% silicon, requiring the use of less than 50 psi overpressure. On the other hand, the material of Comparative Example A needs an overpressure of 200 psi. The master alloy made with the titanium nitride-coated SiC particles readily redisperses in additional alloy melt to form a metal matrix composite and there was no $Al_4C_3$ formation when the 99.9% pure Al was used. The master alloy made with the particles of Comparative Example A and pure aluminum, however, does not readily redisperse, but rather yields agglomerates. Thus the titanium nitride coating produced by the present invention not only increases the wettability of the particles, as shown by the lower infiltration overpressure, but also prevents undesirable interactions between the aluminum alloy and the silicon carbide particle cores.

EXAMPLE III

The silicon carbide powder particles of Example I are provided with an alumina coating by (i) preparing a boehmite sol at 10 w/o total solids containing 0.15 w/o fine alpha alumina seeds to a state of incipient gelation as described in U.S. Pat. No. 4,623,364, (ii) mixing 100 ml of the sol with 100 g of silicon carbide particles, (iii) pumping the mixture through a spray drier to cause the silicon carbide to be coated with alumina, and (iv) heating the coated particulate at 1200° C. for 30 minutes to convert the alumina gel coating to alpha alumina. The alumina-coated particles are then coated with titanium metal by a pack diffusion process and the titanium metal nitrided, both as in Example I. The characteristic brownish gold color of titanium nitride is produced and this is confirmed by x-ray diffraction analysis.

EXAMPLE IV

Silicon carbide particulates having an average particle size of 50 microns are provided with a boron nitride coating having a thickness of 0.5 micron by chemical vapor deposition using $BCl_3$ as the source of the boron and $NH_3$ as the source of the nitrogen. Thereafter the particles are coated with titanium metal and the titanium metal is nitrided as in Example I. X-ray diffraction analysis confirms conversion to titanium nitride.

EXAMPLE V

Silicon carbide whiskers having diameters of 0.2 to 2 microns and average lengths of 20 to 200 microns are processed as in Example I by calcining in air at 1100° C. for 2 hours, coating with titanium metal by pack diffusion, and then nitrided. The resultant whiskers have a core of silicon carbide, coated with silica, and then coated with titanium nitride.

COMPARATIVE EXAMPLE B

An attempt is made to directly deposit titanium nitride on silicon carbide particles by a chemical vapor deposition procedure. Two different silicon carbide materials are evaluated: the first having an average particle size of 9 microns and the second 100 microns. Titanium tetrachloride and ammonia gas are used to perform the coating. SEM examination of the particles indicates a uniform coating of the 100 micron silicon carbide but only an incomplete coating on many of the individual particles of the 9 micron material.

What is claimed is:

1. A process of coating silicon carbide materials selected from the group consisting of individual particles having an average particle size of about 0.5 to about 1000 microns, whiskers, and fibers with titanium nitride which comprises the steps of (i) placing a coating having a low diffusivity for carbon atop the silicon carbide materials, (ii) placing a titanium metal coating atop the low diffusivity coating, and (iii) nitriding the titanium metal to form titanium nitride.

2. The process of claim 1, wherein the silicon carbide is a particle having an average particle size of up to about 30 microns.

3. The process of claim 1, wherein the silicon carbide is a short fiber having a diameter of up to about 20 microns and a length of up to about 2000 microns.

4. The process of claim 3, wherein the silicon carbide is a whisker having a diameter of up to about 10 microns and a length of up to about 500 microns.

5. The process of claim 1, wherein the low diffusivity layer is selected from the group consisting of silica, alumina, boron nitride, aluminum titanate, glasses, boron, and metal oxides, borides, and nitrides.

6. The process of claim 1, wherein the low diffusivity layer comprises silica.

7. The process of claim 6, wherein the silica layer is formed by heating the silicon carbide in air at a temperature of at least about 700° C.

8. The process of claim 1, wherein the low diffusivity layer is selected from boron nitride and alumina.

9. The process of claim 1, wherein the low diffusivity layer has a thickness of about 200 Angstroms to about 1 micron.

10. The process of claim 1, wherein the titanium metal is deposited by a pack diffusion process.

11. The process of claim 10, wherein the pack diffusion process is performed at a temperature of about 600° to about 775° C. for about 30 minutes to about 5 hours.

12. The process of claim 1, wherein the nitriding is performed at about 900° to about 1050° C. for about 30 to about 90 minutes.

* * * * *